(12) United States Patent
Miyamoto

(10) Patent No.: US 8,159,691 B2
(45) Date of Patent: *Apr. 17, 2012

(54) IMAGE PROCESSING APPARATUS, INFORMATION PROCESSING APPARATUS, AND INFORMATION OUTPUT METHOD

(75) Inventor: Ryosuke Miyamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/087,416

(22) Filed: Apr. 15, 2011

(65) Prior Publication Data

US 2011/0194134 A1  Aug. 11, 2011

Related U.S. Application Data

(63) Continuation of application No. 10/500,130, filed on Jun. 25, 2004, now Pat. No. 7,965,399.

(30) Foreign Application Priority Data

Feb. 18, 2002 (JP) .................................. 2002-040449
Jan. 29, 2003 (JP) .................................. 2003-021040

(51) Int. Cl.
*G06K 15/00* (2006.01)

(52) U.S. Cl. ..................... 358/1.13; 358/1.14; 358/1.15; 358/1.16

(58) Field of Classification Search ................. 358/1.14, 358/1.15, 1.16; 324/113; 702/60–61, 180; 705/412; 713/330

See application file for complete search history.

(56) References Cited

U.S. PATENT DOCUMENTS

| | | | |
|---|---|---|---|
| 4,496,237 A | 1/1985 | Schron | |
| 4,811,052 A | 3/1989 | Yamakawa et al. | |
| 4,998,215 A | 3/1991 | Black et al. | |
| 5,163,153 A | 11/1992 | Cole et al. | |
| 5,300,980 A | 4/1994 | Maekawa et al. | |
| 5,517,649 A | 5/1996 | McLean | |
| 5,566,084 A | 10/1996 | Cmar | |
| 5,580,177 A | 12/1996 | Gase et al. | |
| 5,724,630 A | 3/1998 | Mashiba | |
| 5,838,577 A | 11/1998 | Tokano | |
| 5,877,785 A | 3/1999 | Iwasaki et al. | |
| 5,937,148 A | 8/1999 | Okazawa | |
| 5,950,148 A | 9/1999 | Nakagawa et al. | |
| 6,002,878 A | 12/1999 | Gehman et al. | |
| 6,018,690 A | 1/2000 | Saito et al. | |
| 6,029,238 A * | 2/2000 | Furukawa | 712/1 |
| 6,069,706 A | 5/2000 | Kajita et al. | |
| 6,185,515 B1 | 2/2001 | Froger et al. | |
| 6,347,202 B1 | 2/2002 | Shishizuka et al. | |
| 6,476,728 B1 | 11/2002 | Sakakibara | |
| 6,594,767 B1 * | 7/2003 | Wiley et al. | 713/300 |

(Continued)

FOREIGN PATENT DOCUMENTS

JP   7129042   5/1995

(Continued)

Primary Examiner — Twyler Haskins
Assistant Examiner — Richard Zhu
(74) Attorney, Agent, or Firm — Fitzpatrick, Cella, Harper & Scinto

(57) ABSTRACT

In a composite machine provided with a copy mode and a print mode, an operation history of each operation mode is accurately timed and log information concerning an electric power of the composite machine for processing various jobs such as the copy mode and the print mode is prepared based on a timed value.

11 Claims, 10 Drawing Sheets

| DEPARTMENT | USER | DATE AND TIME | OPERATION MODE | USING TIME |
|---|---|---|---|---|
| DEVELOPMENT DEPARTMENT | USER 1 | 2001/1/1 TO | COPY | 5 MINUTES |
| DEVELOPMENT DEPARTMENT | USER 1 | 2001/1/1 TO | PRINT | 1 MINUTES |
| DEVELOPMENT DEPARTMENT | USER 1 | 2001/1/1 TO | FAX TRANSMISSION | 1 MINUTES |
| DEVELOPMENT DEPARTMENT | USER 2 | 2001/1/1 TO | COPY | 5 MINUTES |
| DEVELOPMENT DEPARTMENT | USER 2 | 2001/1/1 TO | PRINT | 1 MINUTES |
| DEVELOPMENT DEPARTMENT | USER 2 | 2001/1/1 TO | FAX TRANSMISSION | 1 MINUTES |
| ⋮ | ⋮ | ⋮ | ⋮ | ⋮ |
| MANAGEMENT DEPARTMENT | USER 1 | 2001/1/1 TO | COPY | 5 MINUTES |
| MANAGEMENT DEPARTMENT | USER 1 | 2001/1/1 TO | PRINT | 1 MINUTES |
| MANAGEMENT DEPARTMENT | USER 1 | 2001/1/1 TO | FAX TRANSMISSION | 1 MINUTES |
| MANAGEMENT DEPARTMENT | USER 2 | 2001/1/1 TO | COPY | 5 MINUTES |
| MANAGEMENT DEPARTMENT | USER 2 | 2001/1/1 TO | PRINT | 1 MINUTES |
| MANAGEMENT DEPARTMENT | USER 2 | 2001/1/1 TO | FAX TRANSMISSION | 1 MINUTES |
| ⋮ | ⋮ | ⋮ | ⋮ | ⋮ |
| GENERAL AFFAIRS DEPARTMENT | USER 1 | 2001/1/1 TO | COPY | 50 MINUTES |
| GENERAL AFFAIRS DEPARTMENT | USER 1 | 2001/1/1 TO | PRINT | 1 MINUTES |
| GENERAL AFFAIRS DEPARTMENT | USER 1 | 2001/1/1 TO | FAX TRANSMISSION | 1 MINUTES |
| GENERAL AFFAIRS DEPARTMENT | USER 2 | 2001/1/1 TO | COPY | 50 MINUTES |
| GENERAL AFFAIRS DEPARTMENT | USER 2 | 2001/1/1 TO | PRINT | 30 MINUTES |
| GENERAL AFFAIRS DEPARTMENT | USER 2 | 2001/1/1 TO | FAX TRANSMISSION | 30 MINUTES |
| ⋮ | ⋮ | ⋮ | ⋮ | ⋮ |

U.S. PATENT DOCUMENTS

| | | | |
|---|---|---|---|
| 6,795,829 B2 * | 9/2004 | Alsop et al. | 1/1 |
| 6,865,620 B2 | 3/2005 | Homma | |
| 6,918,645 B2 * | 7/2005 | Takahashi | 347/16 |
| 7,103,787 B2 | 9/2006 | Cantwell | |
| 7,120,911 B1 | 10/2006 | Katayama | |
| 7,219,034 B2 | 5/2007 | McGee et al. | |
| 7,469,991 B2 | 12/2008 | Suzuki et al. | |
| 7,965,399 B2 * | 6/2011 | Miyamoto | 358/1.14 |
| 2001/0017700 A1 * | 8/2001 | Homma | 358/1.1 |
| 2001/0034745 A1 | 10/2001 | Ishii et al. | |
| 2002/0152184 A1 | 10/2002 | Katsuda | |
| 2003/0128991 A1 | 7/2003 | Carling et al. | |
| 2004/0148529 A1 | 7/2004 | Cantwell | |

FOREIGN PATENT DOCUMENTS

| | | |
|---|---|---|
| JP | 8104044 | 4/1996 |
| JP | 8130595 | 5/1996 |
| JP | 09-186802 | 7/1997 |
| JP | 11-024517 | 1/1999 |

* cited by examiner

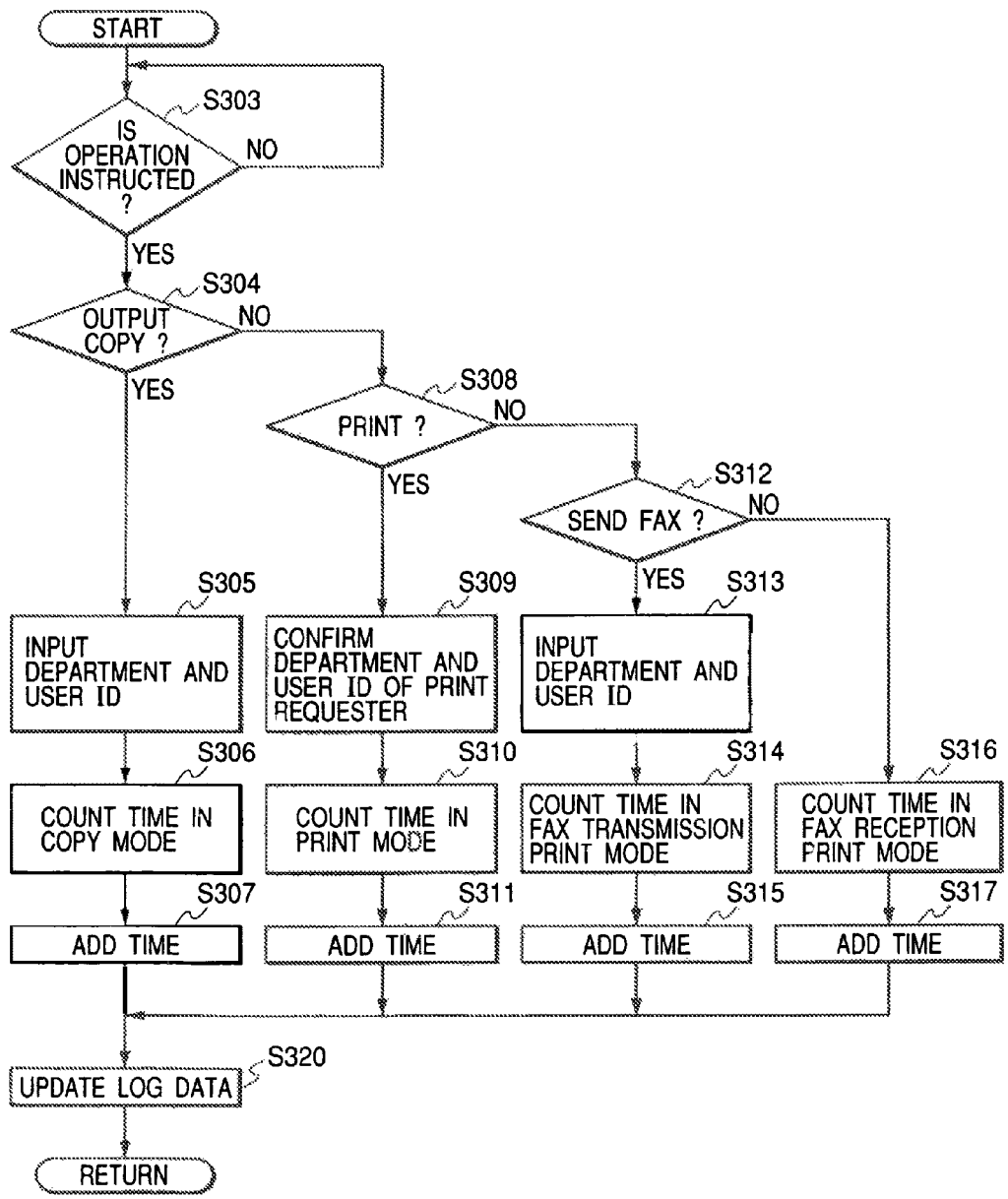

FIG. 4

| DEPARTMENT | USER | DATE AND TIME | OPERATION MODE | USING TIME |
|---|---|---|---|---|
| DEVELOPMENT DEPARTMENT | USER 1 | 2001/1/1 TO | COPY | 5 MINUTES |
| DEVELOPMENT DEPARTMENT | USER 1 | 2001/1/1 TO | PRINT | 1 MINUTES |
| DEVELOPMENT DEPARTMENT | USER 1 | 2001/1/1 TO | FAX TRANSMISSION | 1 MINUTES |
| DEVELOPMENT DEPARTMENT | USER 2 | 2001/1/1 TO | COPY | 5 MINUTES |
| DEVELOPMENT DEPARTMENT | USER 2 | 2001/1/1 TO | PRINT | 1 MINUTES |
| DEVELOPMENT DEPARTMENT | USER 2 | 2001/1/1 TO | FAX TRANSMISSION | 1 MINUTES |
| : | : | : | : | : |
| MANAGEMENT DEPARTMENT | USER 1 | 2001/1/1 TO | COPY | 5 MINUTES |
| MANAGEMENT DEPARTMENT | USER 1 | 2001/1/1 TO | PRINT | 1 MINUTES |
| MANAGEMENT DEPARTMENT | USER 1 | 2001/1/1 TO | FAX TRANSMISSION | 1 MINUTES |
| MANAGEMENT DEPARTMENT | USER 2 | 2001/1/1 TO | COPY | 5 MINUTES |
| MANAGEMENT DEPARTMENT | USER 2 | 2001/1/1 TO | PRINT | 1 MINUTES |
| MANAGEMENT DEPARTMENT | USER 2 | 2001/1/1 TO | FAX TRANSMISSION | 1 MINUTES |
| : | : | : | : | : |
| GENERAL AFFAIRS DEPARTMENT | USER 1 | 2001/1/1 TO | COPY | 50 MINUTES |
| GENERAL AFFAIRS DEPARTMENT | USER 1 | 2001/1/1 TO | PRINT | 1 MINUTES |
| GENERAL AFFAIRS DEPARTMENT | USER 1 | 2001/1/1 TO | FAX TRANSMISSION | 1 MINUTES |
| GENERAL AFFAIRS DEPARTMENT | USER 2 | 2001/1/1 TO | COPY | 50 MINUTES |
| GENERAL AFFAIRS DEPARTMENT | USER 2 | 2001/1/1 TO | PRINT | 30 MINUTES |
| GENERAL AFFAIRS DEPARTMENT | USER 2 | 2001/1/1 TO | FAX TRANSMISSION | 30 MINUTES |
| : | : | : | : | : |
| : | : | : | : | : |

FIG. 5

| MODES | TIME OF EACH MODE |
|---|---|
| SLEEP MODE | 4 HOURS 0 MINUTES |
| LOW POWER MODE 1 | 4 HOURS 30 MINUTES |
| LOW POWER MODE 2 | 4 HOURS 30 MINUTES |
| STANDBY MODE | 3 HOURS 30 MINUTES |
| COPY OUTPUT MODE | 4 HOURS 30 MINUTES |
| PRINT OUTPUT MODE | 2 HOURS 20 MINUTES |
| FAX TRANSMISSION MODE | 0 HOURS 20 MINUTES |
| FAX RECEPTION / PRINT MODE | 0 HOURS 20 MINUTES |
| DATE AND TIME WHEN OPERATION STATE WAS OBTAINED LAST TIME | 0 O'CLOCK 0 MINUTES, JANUARY 1, 2001 |
| DATE AND TIME WHEN OPERATION STATE WAS OBTAINED THIS TIME | 0 O'CLOCK 0 MINUTES, JANUARY 2, 2001 |

FIG. 6

|  | POWER CONSUMPTION W | REMARKS |
|---|---|---|
| SLEEP MODE | 10 | RETURN TO STANDBY STATE IN PREDETERMINED TIME 1 |
| LOW POWER MODE 1 | 50 | RETURN TO STANDBY STATE IN PREDETERMINED TIME 2 |
| LOW POWER MODE 2 | 90 | RETURN TO STANDBY STATE IN PREDETERMINED TIME 3 |
| STANDBY MODE | 100 | IMMEDIATELY OPERABLE STATE |
| COPY OUTPUT MODE | 500 |  |
| PRINT OUTPUT MODE | 500 |  |
| FAX TRANSMISSION MODE | 150 |  |
| FAX RECEPTION / PRINT MODE | 500 |  |

FIG. 7

| 2001/1/1 0 O'CLOCK 0 MINUTES TO 2001/1/2 0 O'CLOCK 0 MINUTES | POWER CONSUMPTION W | ELECTRIC ENERGY Wh |
|---|---|---|
| SLEEP MODE | 10 | 40 |
| LOW POWER MODE 1 | 50 | 225 |
| LOW POWER MODE 2 | 90 | 405 |
| STANDBY MODE | 100 | 350 |
| COPY OUTPUT MODE | 500 | 2250 |
| PRINT OUTPUT MODE | 500 | 1166 |
| FAX TRANSMISSION MODE | 150 | 50 |
| FAX RECEPTION / PRINT MODE | 500 | 166 |

| DEPARTMENT | PERIOD | OPERATION MODE | POWER CONSUMPTION W |
|---|---|---|---|
| DEVELOPMENT DEPARTMENT | 2001/1/1 TO 31 | COPY | 110 |
| MANAGEMENT DEPARTMENT | 2001/1/1 TO 31 | PRINT | 10 |
| GENERAL AFFAIRS DEPARTMENT | 2001/1/1 TO 31 | FAX TRANSMISSION | 5 |

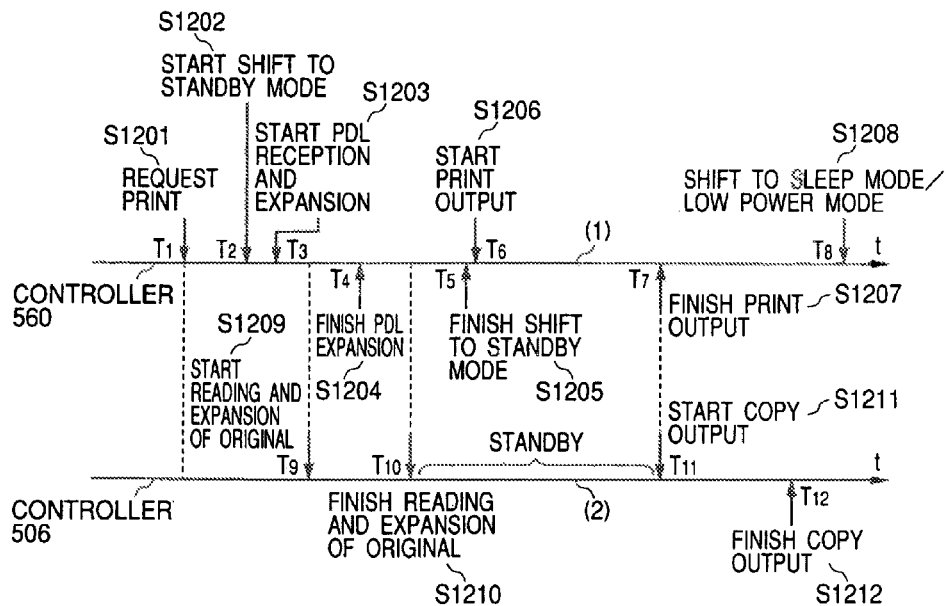

IMAGE PROCESSING APPARATUS, INFORMATION PROCESSING APPARATUS, AND INFORMATION OUTPUT METHOD

This application is a continuation of U.S. patent application Ser. No. 10/500,130, filed Jun. 25, 2004.

TECHNICAL FIELD

The present invention generally relates to an information processing apparatus shared by a plurality of users, and in particular to an image processing apparatus for urging, users to reduce power consumption.

BACKGROUND ART

Reduction of power consumption of an image processing apparatus represented by a composite machine or the like has become one of important problems due to increase in users' interest in energy saving. A user often determines a product that the user is going to purchase placing importance on whether or not power consumption described in a product catalogue is low.

Moreover, energy saving is also recommended in foreign countries and various regulations and standards are relaxed. For example, the Energy Saving Law has been enacted in Japan. In the foreign countries, there are standards such as Energy Star and Blue Angel, under which a product which clears fixed conditions is allowed to be affixed a logo or the like. In order to clear the conditions, there are a lot of ideas incorporated in every product, for example, introducing an operation mode such as a sleep mode, a standby mode, or a low power mode.

On the other hand, Japanese Patent Application Laid-Open No. 08-130595 discloses a facsimile apparatus for printing a history of executing energy saving together with an execution mode/time, and also discloses a mechanism in which, when a sleep condition is satisfied, the facsimile apparatus executes energy saving such as starting up a sub-CPU and stopping a main CPU, stores a total time of the energy saving, and displays reduced costs based on the stored time.

However, in the composite machine as described above, respective operations such as a copy output mode, a print output mode, a FAX transmission mode, and a FAX reception output mode are instructed to be executed at arbitrary timing. Thus, power consumption in such a composite machine cannot be monitored. For example, there was a problem in that it was necessary to monitor a history of power consumption even if the print output mode and the FAX transmission mode were executed in parallel.

DISCLOSURE OF THE INVENTION

It is an object of the present invention to solve the above-described problems and provide an information processing apparatus, an image processing apparatus, and an information output method for precisely managing a history of power consumption in a composite machine and urging a user to save an electric power even after the user purchases the product.

In order to solve the above-mentioned problems, an image processing apparatus having a plurality of operation modes is provided which includes a mechanism for measuring operation time data from a start to an end of a predetermined operation mode as an intermittent operation time according to a job execution schedule corresponding to another operation mode and preparing information concerning power consumption of the predetermined operation mode based on the measured time value.

Further, an image processing apparatus is provided which has a plurality of operation modes including a first operation mode for outputting image data read by an image reading means and a second operation mode for outputting print data received from an external source. The image processing apparatus stores, for each operation mode, a power consumption standard and operation time data, generates statistic information concerning the power consumption of the apparatus based on the power consumption standard and the operation time data, and performs data output based on the statistic information.

Further, an information processing apparatus which is capable of communicating with a plurality of composite machines is provided, in which information concerning power consumption based on an operation time for each operation mode to be measured in the composite machines, respectively, is received, and statistic information concerning power consumption based on the received information is outputted.

BRIEF DESCRIPTION OF THE DRAWINGS

FIG. 3 is a flowchart of processing of the composite machine in accordance with the first embodiment;

FIG. 4 is a table showing an example of log data for each user in accordance with the first embodiment;

FIG. 5 is a table showing an example of log data for each mode in accordance with the first embodiment;

FIG. 6 is a table showing power consumption per a unit time for each mode in accordance with the first embodiment;

FIG. 7 is a table showing an example of reference data of power consumption for each mode in accordance with the first embodiment;

FIG. 12 illustrates an example of a flowchart for preparing a log in accordance with a fifth embodiment; and FIG. 13 is a table showing an example of prepared log data in accordance with the fifth embodiment.

BEST MODE FOR CARRYING OUT THE INVENTION

Embodiments of the present invention will be hereinafter described. It goes without saying that the embodiments described below are disclosed in order to facilitate implementation by those skilled in the art and are only a part of embodiments included in the technical scope of the present invention which is defined by the claims. Therefore, it is clear for those skilled in the art that even embodiments which are not directly described in this specification are included in the technical scope of the present invention as long as the embodiments share the technical thought.

Note that, although a plurality of embodiments are described for convenience of understanding, those skilled in the art could easily understand that the invention is not only established by these embodiments individually but also established by combining the embodiments appropriately.

First Embodiment

Figure 1:
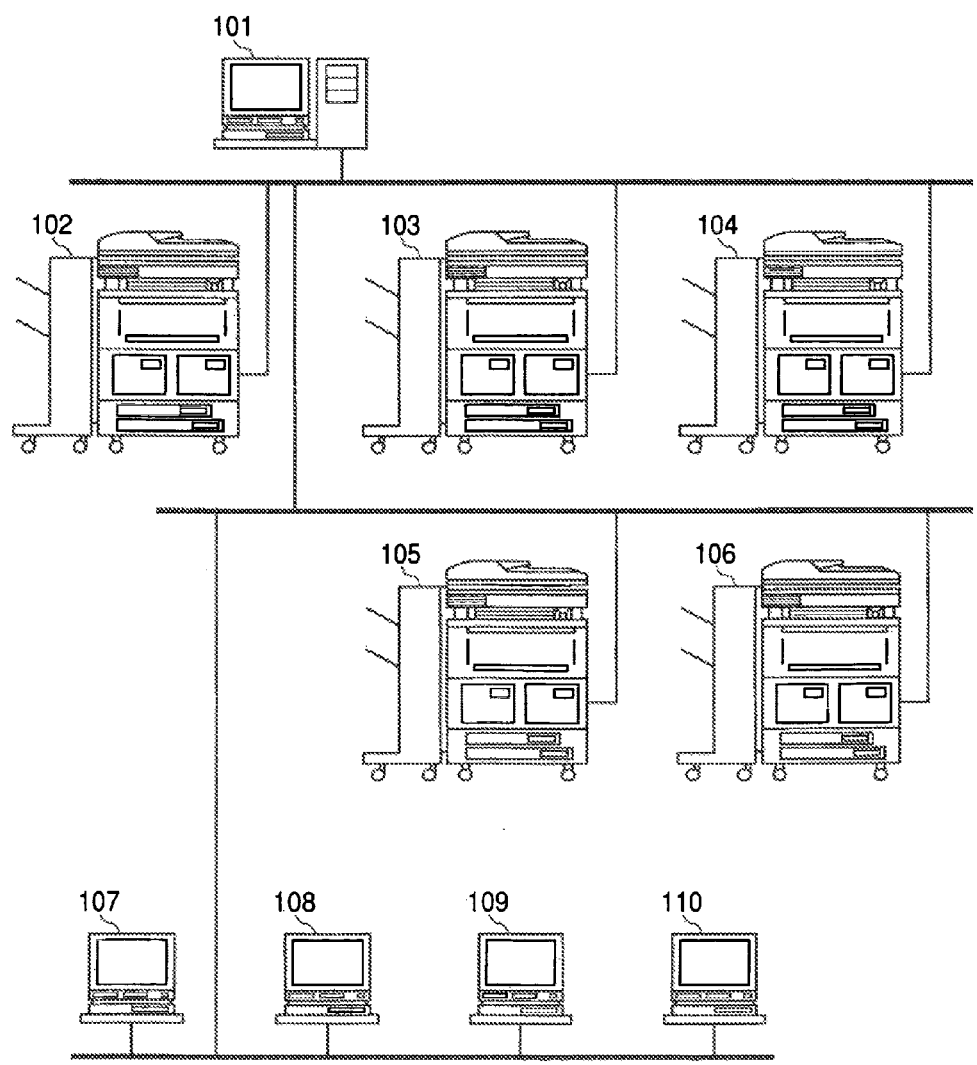
FIG. 1 illustrates an example of a structure of an image processing system in accordance with a first embodiment.

In this embodiment, the present invention is applied to an image processing system. FIG. 1 schematically shows an image processing system which includes a plurality of composite machines and a management server. Reference numeral 101 denotes a management server which receives information concerning power consumption from each composite machines and aggregates total power consumption. Note that the management server is an option and is not always necessary in the first embodiment. Reference numerals 102 to 106 denote composite machines equipped with a copy function, a facsimile function, and a network printer function. For example, the composite machine 102 is a composite machine capable of outputting 105 copies of an original of the A4 size per minute (hereinafter referred to as 105 cpm). For example, it is assumed that the composite machines 103, 104, 105, and 106 have a processing capability of 85 cpm, 60 cpm, 33 cpm, and 22 cpm, respectively. Reference numerals 107 to 110 denote computer terminals (hereinafter referred to as PC) on a client side where network printing is performed.

Figure 2:
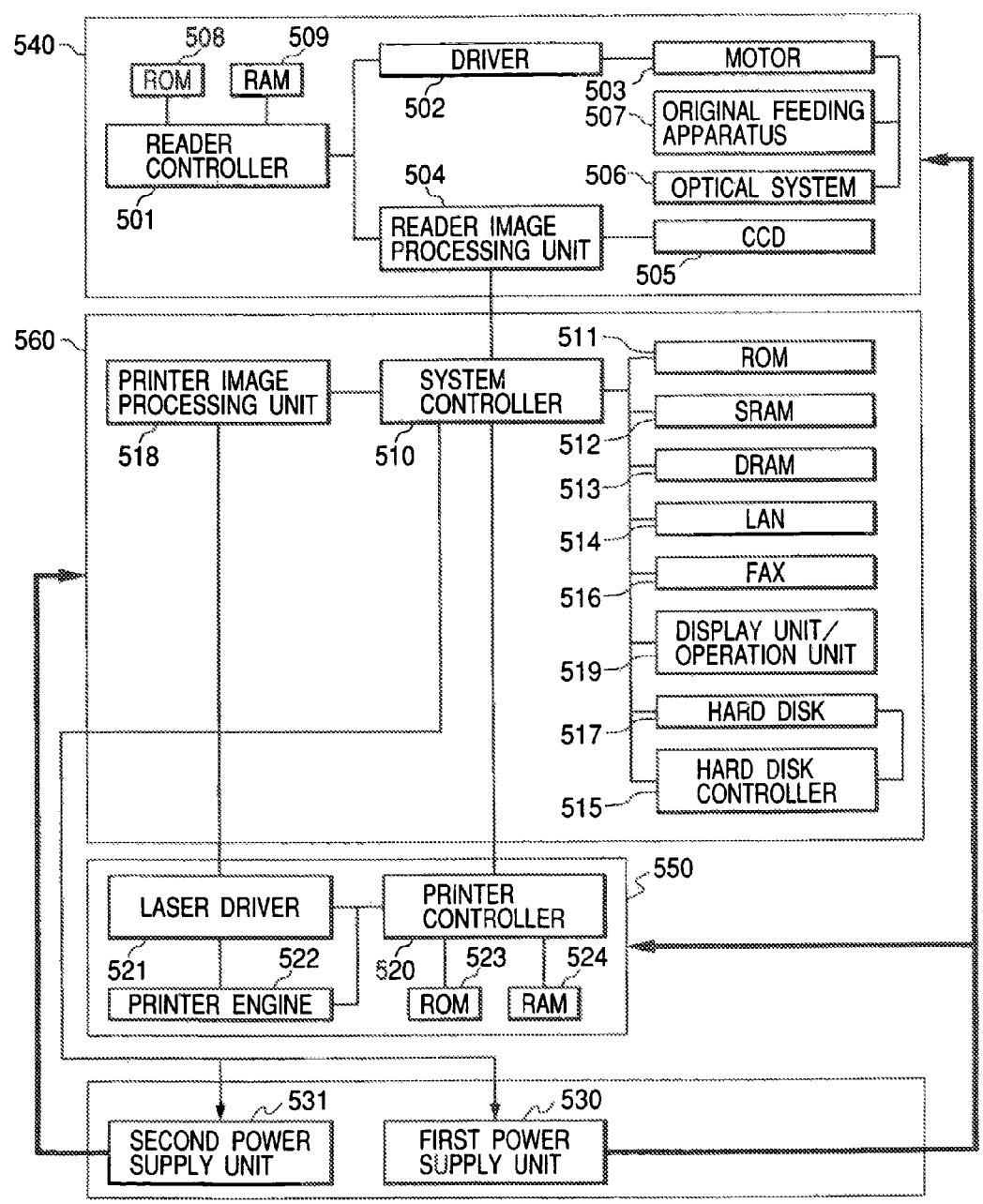
FIG. 2 is a block diagram of a composite machine in accordance with the first embodiment.

Next, operations of each composite machine will be described. FIG. 2 is a block diagram of the composite machines 102 to 106. The composite machines are mainly constituted by three parts, namely, a reader 540, a printer 550, and a controller 560.

A reader controller 501 controls an original reading unit. A motor driver 502 controls drive of a motor 503. The motor 503 drives an original feed unit 507 and a reading optical system 506. The reader image processing unit 504 reads an original and performs signal processing of data. Reference numeral 505 denotes a CCD for performing operations ranging from original reading to photoelectrical conversion. An ROM 508 and an RAM 509 are memory means for the reader controller, respectively.

A system controller 510 controls all or a part of the composite machines. A Boot-ROM 511 incorporates an initial program for start-up. An SRAM 512 stores various data which are required to be stored even after turning off a power supply. A DRAM 513 is memory means functioning as a program data memory for control, a memory for work, and a temporary image data memory. An LAN board 514 is an interface for connecting with a network. A hard disk 517 stores a start-up program and image data for saving. A hard disk controller 515 performs reading and writing controls of the hard disk 517. A FAX board 516 is equipped with a facsimile communication function. A printer image processing unit 518 performs signal processing of image data which should be outputted to a printer. A display unit/operation unit 519 is means for displaying necessary information or inputting an instruction of a user when the user instructs an operation such as copying. For example, the display unit is constituted by a liquid crystal display and the operation unit is constituted by a touch panel and the like. It would be obvious for those skilled in the art that the display unit/operation unit 519 is not required to be constituted integrally but may be implemented individually.

A printer controller 520 controls a printer engine. An ROM 523 and an RAM 524 are memory means for the printer controller 520, respectively. A laser driver 521 receives a printer image data signal to perform laser control. A printer engine 522 is image forming means for performing image formation.

A first power supply unit 530 supplies an electric power to a reader 540 and a printer 550. A second power supply unit 531 supplies an electric power to a controller 560. The composite machines 102 to 106 have the same structure as that shown in FIG. 2, respectively.

Next, an operation for each mode will be described.

Start-Up Processing

When a main power supply switch (not shown) is turned ON, an electric power is supplied to the controller 560 from the power supply unit 531. Then, a CPU (not shown) in the system controller 510 starts up the initial program of the Boot-ROM 511. Then, the CPU reads out a control program stored in the hard disk 517 via the hard disk controller 515 and transfers the program to the DRAM 513. A start-up sequence of the entire composite machines is started by starting up the transferred control program.

The system controller 510 controls the second power supply unit 530 to be ON and supplies an electric power to the reader 540 and the printer 550. The reader controller 501 of the reader 540 and the printer controller 520 in the printer 550 are started up, respectively. In the reader 540, an initialization operation for a light and a motor of an optical system is performed. In the printer 550, an initialization operation of a printer engine is performed.

Copy Output Mode

When an original is placed on the original feed device 507 and a copy start button (not shown) of the operation unit 519 is pressed, the image data signal photoelectrically converted by the CCD 505 is subjected to processing such as shading correction, magnification, and binarization in the reader image processing unit 504. The data after the processing is stored in the DRAM 513 via the system controller 501. Next, the image data on the DRAM 513 is sent to the printer image processing unit 518 via the system controller 510 and is subjected to processing such as gamma conversion there. Moreover, the image data is print-outputted by the printer engine 522 via the laser driver 512.

Print Output Mode

When data which should be printed is sent from the PCs 107 to 110 connected over the network and received via the LAN card 514, the data is written in the DRAM 513. The data is expanded to bit map data which should be printed by the system controller 510. The bit map data after expansion is written in the DRAM 513 again. Thereafter, the bit map data is outputted to the printer engine 522 via the printer image processing unit 518 as in the copy output processing.

FAX Transmission Mode

As in the copy operation, when an original is placed on the original feed device 507, a dial number of a transmission destination is inputted according to the FAX transmission mode displayed on the display unit/operation unit 519, and a start button is pressed. An image signal read by the CCD 505 is stored in the DRAM 513 as data as in the above-described copy output processing. The FAX transmission processing is proceeded in a predetermined procedure from the FAX board 516, and image data stored in the DRAM 513 is sent to a FAX line.

FAX Reception Mode

When there is an incoming call to the FAX board 516 from the FAX line, FAX reception processing is executed in a predetermined procedure and bit map data is stored in the DRAM 513. Thereafter, the bit map data is outputted to the print engine 522 via the printer image processing unit 518 as in the copy output processing.

Sleep Mode

In the case in which processing such as copying, printing, or transmission and reception of an FAX is not executed even if a time set in advance has elapsed, the system controller 510 instructs the reader controller 501 and the printer controller 520 to shift the reader 540 and the printer 550 to a sleep state, respectively. Then, when the system controller 510 judges that the reader 540 and the printer 550 has changed to a state in which they can be shifted to the sleep state, the first power supply unit 530 executes OFF control to stop supply of an electric power to the reader 540 and the printer 550. In this state, an electric power is supplied only to the system controller 510 from the second power supply unit 531. In the case in which a start-up request is received from a sleep release request SW (not shown) or the like of the LAN board 514, the FAX board 516, and the operation unit 519, and the reader 540 and the printer 550 return from the sleep state, the first power supply unit 530 executes ON control, and the reader 540 and the printer 550 shift to the standby state in a short time set in advance Low Power Mode The printer engine 522 is equipped with a not-shown fixing device. In order to maintain a composite machine in a state in which a fixing operation by this fixing device is available, temperature control by a heater is performed in the standby state. Since power consumption for this temperature control is large, there is a mode for slightly lowering a temperature adjustment level in an attempt to reduce the power consumption. In this mode, since the temperature adjustment level is low, a state in which copying is possible is not reached immediately. Thus, it is necessary to execute the temperature control over a predetermined time to reach the state in which copying is possible. Such a mode is referred to as a low power mode. Two types of modes having different times required for reaching the state in which copying is possible may be provided. These could be referred to as a first low power mode and a second low power mode. In addition, some fixing devices do not require the temperature adjustment control depending upon a type of the fixing device. In this case, it is unnecessary to provide the low power mode. A treatment of such a low power consumption mode is also different according to the number of print outputs of a composite machine.

Collection of an Operation Time

FIG. 3 is a flowchart at the time when a composite machine generates log data for an operation state. FIG. 4 shows an example of the prepared log data. The log data is stored in writable memory means such as the hard disk 517, the DRAM 513, or the SRAM 512.

The system controller 510 executes necessary initialization processing for the log data in advance. For example, the system controller 510 clears operation time data for each operation mode such as sleep, low power consumption, standby, copy output, print output, FAX transmission, and FAX reception print.

In step S303, the system controller 510 waits for an instruction for selecting the operation mode such as the standby mode, the sleep mode, or the low power mode to be inputted from the operation unit 519 by a user. It goes without saying that the instruction may be inputted via the LAN board 514. Upon detecting an operation instruction in 5303, the system controller 510 confirms a factor of the operation instruction based on a signal inputted from the operation unit 519.

In step S304, the system controller 510 executes judgment on whether or not the inputted instruction is a copy instruction. If it is the copy instruction, the system controller 510 proceeds to step S305 and inputs a user ID and an ID of a department to which the user belongs from the operation unit 519 in order to confirm a department to which the user belongs and a user name. Input of the user ID and the like may be executed by causing a not-shown card reader to read a management card of the user.

In step S306, the system controller 510 executes the copy processing instructed by the user and, at the same time, starts up a timer to count an operation time of the copy output mode. In step S307, the system controller 510 adds an operation time of this time to a cumulative value up to the last time of the copy output mode, thereby calculating the latest cumulative time. In step S320, the system controller 510 stores information concerning the department name, the user name (user ID), the date and time, the operation mode, and the using time obtained in this way in the hard disk 517 as the log data (FIG. 4).

On the other hand, upon judging that the inputted instruction is a print output instruction in step S308, the system controller 510 proceeds to step S309. In step S309, the system controller 510 obtains a department to which the user belongs and a user name from a print request data sent via the network. In step S310, the system controller 510 starts up a timer, executes the print processing instructed by the user, and measures an operation time in the print output mode with the timer. In step S311, the system controller 510 adds an operation time of this time to a cumulative value up to the last time of the print output mode to calculate a new cumulative time. In step S320, the system controller 510 stores the data in the hard disk 517 as the log data (FIG. 4).

In addition, in step S312, the system controller 510 judges whether or not the inputted instruction is a FAX transmission instruction. If it is the FAX transmission instruction, the system controller 510 proceeds to step S313, or otherwise proceeds to step S316. In step S313, the system controller 510 performs the same processing as step S306. In step S314, the system controller 510 starts up a timer in order to measure an operation time and performs the FAX transmission processing instructed by the user. When the transmission processing is completed, the system controller 510 stops the timer and adopts a timer value at that time as the operation time. In step S315, the system controller 510 adds an operation time of this time to a cumulative time up to the last time for the FAX transmission mode to calculate a new cumulative value. In step S320, the system controller 510 stores information concerning the department name, the user name (user ID), the date and time, the operation mode, and the using time obtained in this way in the hard disk 517 as the log data (FIG. 4).

In the case of FAX reception processing, the system controller proceeds to step S316, causes the FAX board 516 to receive arbitrary FAX information, and prints received image data with the above-described method. For example, the system controller 510 starts up a timer in order to measure an operation time and executes the FAX reception processing and the print processing. When the reception processing and the print processing are completed, the system controller 510 stops the time and adopts a timer value at that time as the operation time. Moreover, the system controller 510 adds an operation time of this time to a cumulative time up to the last time for the FAX reception mode to calculate a new cumulative value. In step S320, the system controller 510 stores information concerning the date and time, the operation mode, and the using time obtained in this way in the hard disk 517 as the log data (FIG. 4). Note that, in the case in which the FAX board 516 has received information for designating a department name and a user name (user ID) of a receiving side together with a telephone number from a sender of a facsimile, log data could be prepared together with the department name and the user name (user ID).

Note that, as shown in FIG. 5, it is also possible to store a cumulative value of an operation time for each mode. There are various methods of preparing the data of FIG. 5. For example, the data may be prepared by performing retrieval concerning the log data shown in FIG. 4 with an operation mode as a keyword and aggregating information concerning an operation time equal to or exceeding a position obtained by the retrieval. In addition, in the time adding processing of step S307 and the like, the system controller 510 may read out a cumulative value of an operation time concerning the present operation mode from the data of FIG. 7 stored in the hard disk 517, add an operation time of this time to the read out value, and update the data of FIG. 5 in step S320.

Calculation of a Reference of Power Consumption

A method of calculating a reference of power consumption in each composite machine will be described based on the operation times shown in FIG. 4 or 5, FIG. 6 shows an example of a table concerning power consumption per a unit time for each mode. Data shown in FIG. 6 is inherent data, which is referred to when each composite machine calculates power consumption corresponding to an operation mode, and is stored in the memory means such as the ROM 511, the SRAM 512, or the hard disk 517.

The system controller 510 starts up calculation processing of power consumption at appropriate timing. The system controller 510 reads out an operation time for each mode from the log data of FIG. 4 or 5. In addition, the system controller 510 reads out data concerning power consumption for an operation mode which is an object of calculation from the data table of FIG. 6. The system controller 510 multiplies the read out operation time by the read out power consumption, thereby calculating a reference of power consumption. Then, the system controller 510 stores the calculated value in the memory means such as the hard disk 517 as electric energy data shown in FIG. 7. Note that these values may be arranged as log data for each day in the form of a database.

As an alternative, a calculation step of power consumption may be provided in the flowchart of FIG. 3. For example, in the flow chart of FIG. 3, the system controller 510 finds only an operation time of this time and calculates a reference of power consumption of this time by multiplying the operation time by the read out power consumption. In the log data, it is sufficient to store a cumulative value of power consumption in place of an operation time and add the found power consumption of this time to a value of the log data.

Figures 8, 9:
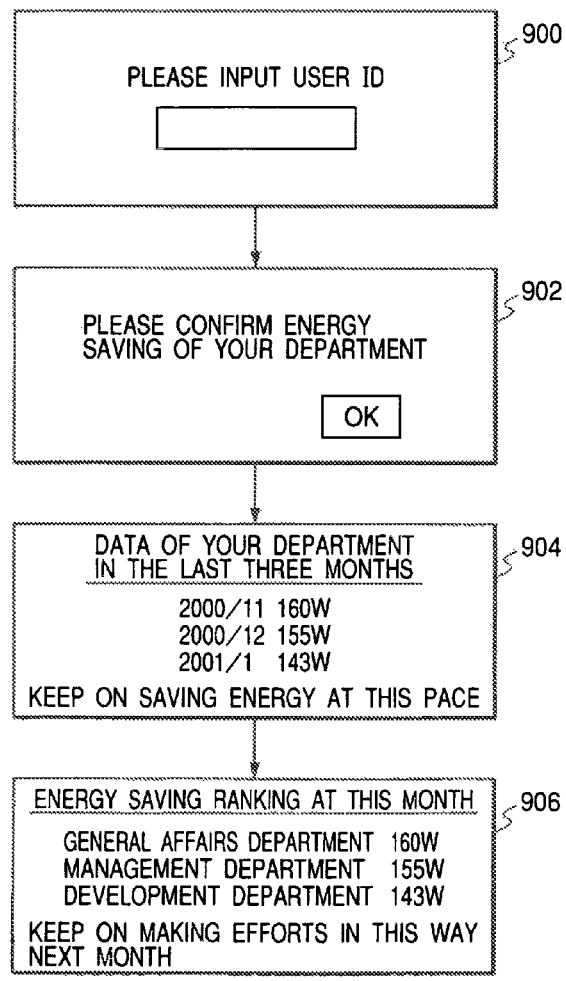
FIG. 8 is a table showing an example of reference data of power consumption for each department in accordance with the first embodiment.
FIG. 9 is a flowchart for displaying an energy saving promotion message in accordance with the first embodiment.

It goes without saying that power consumption may be cumulated for each user or department. In addition, cumulating processing may be executed for power consumption within a predetermined period (e.g., immediately preceding one month) designated by a user. FIG. 8 shows data which is calculated as power consumption data for one month for each department by repeating updates based on the data of FIG. 7.

Laying-Open Processing of Cumulative Data

Next, it will be described how the cumulated data is laid open to a user.

FIG. 9 shows a flowchart for outputting a reference of power consumption. This processing may be started up in the case in which a specific button is pressed in the operation unit 519 or may be started up at the time of input of a department ID or a user ID in step S305 or the like of FIG. 3.

In step S900, the system controller 510 displays an input screen of a department ID or a user ID on the display unit to a user to input a department ID or a user ID, and reads out data concerning power consumption for each department shown in FIG. 8 based on an inputted ID.

In step S902, the system controller 510 displays a screen for urging the user to confirm power saving data of a department to which the user belongs on the display unit. In general, when this processing is executed, the user is performing a desired operation such as copying or sending a facsimile. At this point, it would be possible to improve consciousness of energy saving by obligating the user to confirm the energy saving data. When the OK button is pressed, the system controller 510 proceeds to the next step.

In step S904, the system controller 510 reads out data for each month of the last three months from the hard disk 517 and displays the data on the display unit. Note that it would be more effective if a comment for facilitating energy saving is displayed at this point in addition to actual power consumption.

In step S906, the system controller 510 displays comparison data with other department. For example, the system controller 510 reads out power consumption of this month for each department and sorts departments based on values of the power consumption to display names of departments with unfavorable results together with the values in order from a department with highest power consumption or display names of departments with favorable results in order from a department with lowest power consumption. Consequently, consciousness of competition among departments arise in each user, and further energy saving can be expected.

As described above, according to this embodiment, since power consumption of a composite machine is clarified by managers and users, improvement of consciousness for energy saving will be facilitated.

Second Embodiment

In the first embodiment, the system controller 510 displays the screen of FIG. 9 when an operation mode is instructed and urges a user to confirm power consumption data. However, if confirmation of data is obligated in the middle of an operation, the user may feel it troublesome. That is, if the improvement of consciousness of energy saving is given too much priority, it is likely that operability of a composite machine falls. It would be an important subject to find a way for balancing the improvement of consciousness of energy saving and the operability of a composite machine.

Thus, in this embodiment, for example, the data concerning power consumption of FIG. 9 is displayed after the instruction of an operation mode. In particular, the system controller 510 displays the screen of FIG. 9 after the instruction of an operation mode and in a time zone in which a user does not feel relatively little trouble, for example, at a so-called waiting time such as a time during which an original is being read, a facsimile is being sent, or a print is being outputted.

Consequently, it becomes possible to inform the user of a state of utilization of energy saving while maintaining usual operability.

Third Embodiment

In the first and second embodiments, the system controller 510 urges a user operating a composite machine to confirm information concerning power consumption.

However, in the case in which a composite machine functions as a network printer, a user is often in a place remote from the composite machine and it is difficult for the user to look at a display unit of the composite machine.

Thus, in this embodiment, it is an object to urge a network user to confirm information relating to power consumption to improve consciousness for energy saving of such a network user.

Figure 10:
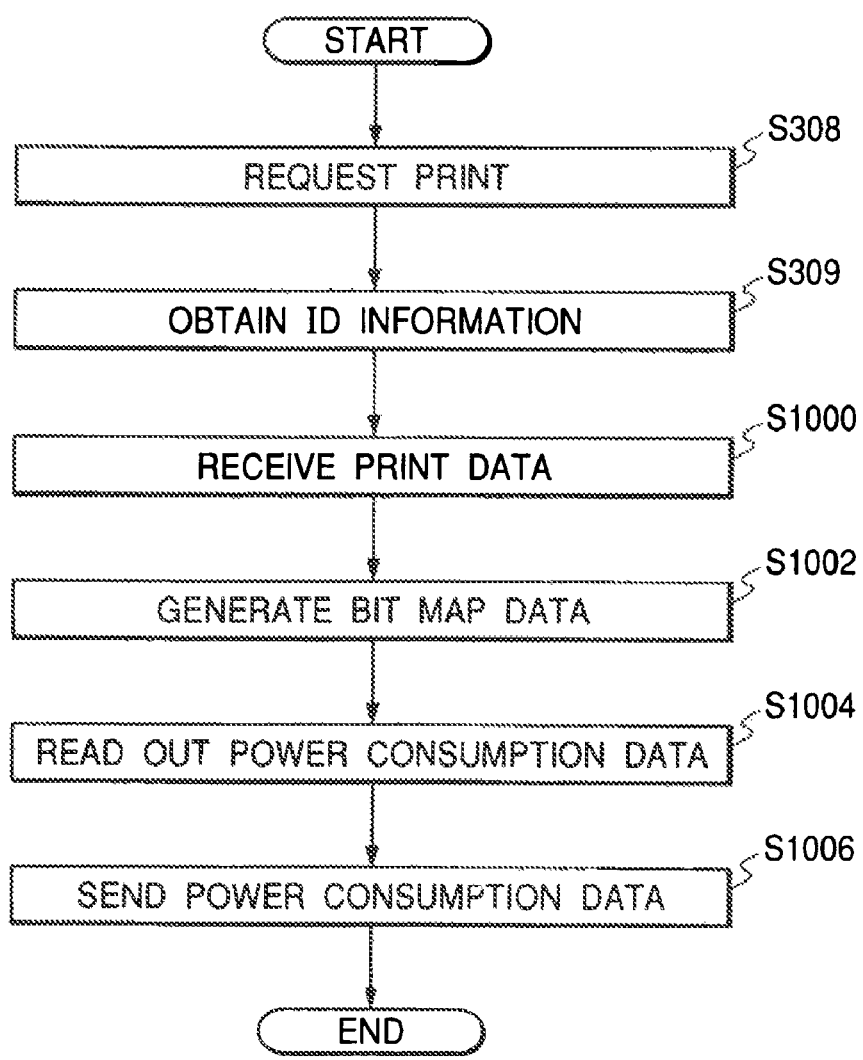
FIG. 10 is a flowchart for providing a network user with an energy saving message in accordance with a third embodiment.

FIG. 10 is a flowchart of processing in accordance with this embodiment. After steps S308 and S309 of FIG. 3 are processed, the system controller 510 proceeds to step S1000 and causes the LAN board 514 to receive print data from a client PC. In step S1002, the system controller 510 causes the printer image processing unit 518 to convert the print data into bit map data. In step S1004, the system controller 510 reads out information relating to power consumption corresponding to department ID information, which is included in a print request, from the hard disk 517. In step S1006, the system controller 510 sends the read out information to the client PC. Consequently, the same power consumption data as in the example shown in FIG. 9 is displayed on a monitor of the client PC.

As described above, in this embodiment, energy saving data is sent via a network, whereby the system controller 510 can prompt even a network user in a place remote from a composite machine to save energy.

Fourth Embodiment

Figure 11:
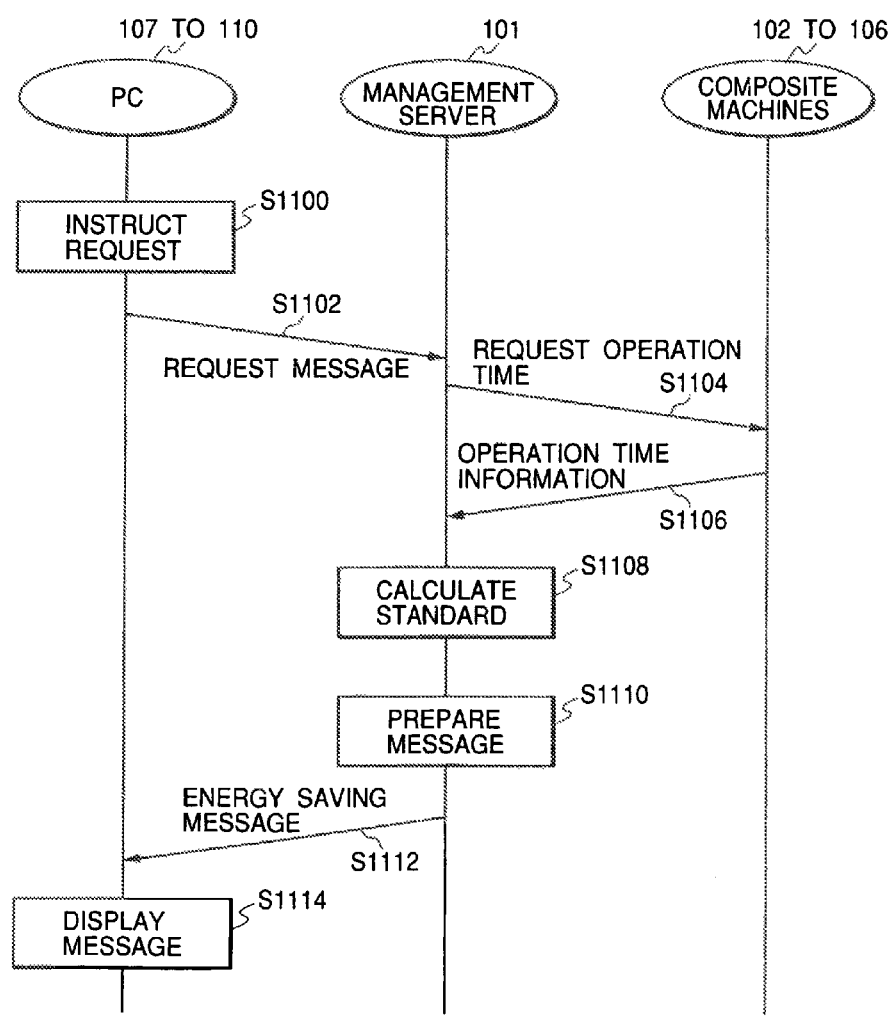
FIG. 11 shows a signal sequence of an image processing system in accordance with a fourth embodiment.

In this embodiment, a reference of power consumption is managed in the management server 101 to provide a user with the reference. FIG. 11 shows a signal sequence of an image output system in accordance with this embodiment. Although an energy saving message is provided based on a request from the PC 107 in this embodiment, a management server may send an energy saving message periodically without based on a request. Note that an energy saving message corresponds to messages of S904 and S905 shown in FIG. 9.

In step S1100, the PC 107 receives an instruction to request an energy saving message with a key operation or the like of a user. In step S1102, the PC 107 sends a request signal to the management server 101. Upon receiving the request signal, in step S1104, the management server 101 sends a request signal for requesting data concerning an operation time (e.g., log data) to each composite machine. In step S1104, the composite machines 102 to 106 reads out log data stored in the hard disk 517 or the like to send it to the management server 101. Upon receiving the log data from each composite machine, in step S1108, the management server 101 finds a reference of an electric energy consumed in a predetermined period using power consumption for each mode shown in FIG. 6 as described above in order to find a reference of power consumption. The data shown in FIG. 6 may be stored in a memory device of the management server 101 or may be obtained from each composite machine. In step S1110, the management server 101 prepares an energy saving message in order to send it to the PC 107. For example, based on an ID of a user, an ID of a department, or the like, the management server 101 prepares a message suitable for the user. As explained in FIG. 9, this message includes data concerning power consumption in the last three months or ranking data for each department. Moreover, the management server 101 may prepare ranking data in a plurality of composite machines taking advantage of the fact that data concerning power consumption can be obtained from the plurality of composite machines, and use it as a message. In step S1112, the prepared energy saving message is sent to the PC 107. In step S1114, the PC 107 displays the received energy saving message on a display. This message may be described, for example, in HTML. In that case, request for the message and display of the message would be executed using a Web browser executed in the PC 107. In addition, this message may be distributed to each user as an electronic mail.

In this way, in this embodiment, a message for facilitating energy saving can be prepared and sent by the management server 101. In addition, since it is sufficient that at least the management server 101 is provided with the data shown in FIG. 6, a structure of a composite machine can be simplified. In addition, an energy saving message may be requested by a composite machine and displayed by the composite machine. In this way, calculation processing in a composite machine can be eliminated. Moreover, since information concerning other composite machines can be displayed in a certain composite machine, it becomes easy to judge which composite machine has an excellent performance for low power consumption. For example, it becomes possible to use a composite machine with less power consumption preferentially, whereby overall power consumption can be reduced.

Fifth Embodiment

In the first to fourth embodiments, the operations for specifying which of the modes shown in FIG. 6 is executed, cumulating an operation time for the specified mode, and finding power consumption based on a cumulative value of these respective operation modes in respective composite machines have been described. In a fifth embodiment, more detailed operations for finding power consumption for the first to fourth embodiments will be described.

In a composite machine provided with a plurality of modes such as a print output mode and an FAX reception mode, the plurality of modes may be processed in a time division manner or in parallel for each page. Processing the plurality of modes in parallel for each page indicates processing for utilizing competing resources (hardware) alternately, for example, performing writing in a memory corresponding to the FAX reception mode on a first page, performing writing in a memory of PDL data in accordance with the print output mode on the next page, and performing writing in a memory corresponding to the FAX reception mode next.

In the fifth embodiment, a reference of power consumption is found in association with execution of the respective operation modes which are processed in a time division manner or in parallel for each page.

FIG. 12 is a time chart for explaining processing for managing scheduling of a plurality of mode operations generated in a composite machine. A relationship of elapse of times on horizontal axes of <1> and <2> is, for example, a positional relationship of T3<T9, and it is assumed that <1> and <2> adopt an identical time, axis.

The time chart shown in FIG. 12 is executed by the system controller 510 in the controller 560 shown in FIG. 2. In addition, a portion other than the system controller 510 may perform the processing for managing the plurality of mode operations shown in FIG. 12 as long as the portion can manage a state of each structure such as the reader 540 and the printer 550 unitarily.

In addition, according to the flowchart of FIG. 12, start and completion processing of each mode are managed by timer means (also referred to as timing means) existing in the system controller 510. A state of the management is shown in FIG. 13. Management information shown in FIG. 13 is prepared by management means for managing user identification information in association with timing by the timing means and is stored in a predetermined memory unit such as the hard disk 517.

First, in step S1201, the system controller 510 recognizes that a print output instruction including a department ID and a user ID is inputted via the LAN board 514. Note that it is assumed that a composite machine is in any one of power saving modes consisting of the sleep mode, the low power mode 1, and the low power mode 2 described in the first to fourth embodiments before the printer output instruction is inputted. In addition, a job ID 1301 is issued in accordance with the start of each operation mode.

In step S1202, the system controller 510 starts shift from the power saving mode to the standby mode and performs temperature control by a heater in order to maintain the composite machine in a state in which a fixing operation by a fixing device is possible. In this way, a temperature of the fixing device is increased to a predetermined temperature with a predetermined electric power.

Then, in step S1203, the system controller 510 receives PDL data via the LAN board 514 and, at the same time, performs processing for expanding received image data to bit map image data.

The above-described processing of step S1202 may be started up by the detection of a print request of step S1201 or may be started up in a predetermined time after detecting a print request. Moreover, the processing of step S1203 may be executed at substantially the identical timing as step S1201 or step S1202 or may be performed earlier than step S1202.

In step S1204, a notice of completion the PDL expansion processing is sent, and log information of time required for PDL expansion of (T4–T3) is prepared and the prepared log information is stored in the memory unit such as the hard disk 517 as a cumulative value of detailed log information 1304 in the print output mode shown in FIG. 5. Management of the print output mode shown in FIG. 5 is performed in association with a job ID and a department/user ID as shown in S1301 of FIG. 13. Here, the department/user ID in FIG. 13 corresponds to the departments shown in FIGS. 8 and 9.

Then, in step S1205, at the completion of shift of a temperature of the fixing device to the standby mode, the shift completion is notified to the system controller 510. At this point, the time of (T5–T2) in the figure is a time required for shifting to the standby mode (T5–T2) the log information about the time is prepared and stored as an addition of the cumulative value of the "standby mode" shown in FIG. 5. Note that, although the department/user ID associated with the standby mode is shown as "ID A" in FIG. 13, a department/user ID may not be associated with a mode of power control processing unrelated to an image such as output of an image or a transmission and reception of an image, for example, the standby mode, the sleep mode, and the low power mode. In this case, power consumption required for the mode of power control processing unrelated to an image is processed by the preparation means such that the power consumption is not included in statistic information prepared in association with the department/user ID, and statistic information as shown in FIG. 8 is finally prepared. In addition, power consumption required for the mode of power control processing unrelated to an image is assumed to be that for the sleep mode, the low power mode 1, the low power mode 2, or the standby mode shown in FIG. 7, and statistic information is prepared in a form which is not associated with the department/user ID. In this way, log information is prepared by distinguishing whether or not the department/user ID is associated thereto and statistic information is prepared in accordance with the log information, whereby statistic information with more sense of fairness among departments/users can be prepared.

Note that the statistic information in the first to eighth embodiments means aggregated information or information to be a basis for preparing aggregated information. For example, log information shown in FIGS. 4 and 5 which is used by a predetermined apparatus to perform aggregation is included in the aggregated information and explained. In addition, information as shown in FIGS. 8 and 9 which is processed based on the log information as shown in FIG. 4 can also be included in the aggregated information.

In step S1206, printing is instructed to the printer controller 520 and, at the same time, print output as a printing operation to a medium in the printer engine 522 is executed. Note that, as timing for executing step S1206, timing when it is detected by step S1205 that the composite machine has shifted to standby mode is adopted.

Then, the completion of print output in accordance with step S1206 is notified to the system controller 510 in step S1207. This notice of completion of print output is issued based on a sheet delivery signal to be issued in response to a medium on which an image is formed in the print engine 522 being outputted to a sheet delivery bin. Then, in step S1207, log information of a print output time in the print output mode of (T7–T6) is prepared and stored in the memory unit such as the hard disk 517 as a cumulative value of detailed log information of the "print output mode" shown in FIG. 5.

On the other hand, in step S1209, a copy request including a department ID or a user ID is sent from the external device, reading of an original is started via the original feed device 507, and image data which is photoelectrically converted via the CCD is expanded and stored in the memory unit. As the department ID or the user ID in this context, an ID different from that of the print output mode is recognized by the system controller 510 as shown in FIG. 13 and stored in the management table.

In step S1210, it is notified to the system controller 510 to the effect that storing of image data, in which an original is read, in the memory means is completed. At this point, log information of time required for reading of an original image and expansion of the image data in the memory unit of T10–T9 is prepared.

Then, upon recognizing the notice of step S1207 to the effect that the print output is completed, the system controller 510 starts output of the image data expanded in the memory means in step S1211, and the print output of the image data is completed in step S1212. At this point, log information of a print output time in the copy output mode of T12–T11 is prepared. Here, the above-mentioned log information of (T10–T9) and (T12–T11) is stored in the memory unit such as the hard disk 517 as a cumulative value of detailed log information of the copy output mode in FIG. 5.

In this way, according to this embodiment, operation time data from a start to an end of a predetermined operation mode (copy output mode) can be measured as an intermittent operation mode. That is, it becomes possible to, even if an operation of the copy output mode is scheduled according to a balance with another operation mode (print output mode) and executed intermittently, measure the intermittent operation time accurately.

Then, the composite machine shifts to a mode for saving an electric power such as the sleep mode or the low power mode in a fixed time after step S1212 (step S1208).

In this way, the same electric power data as that explained in FIG. 7 is prepared based on the management information which is shown in FIG. 13 prepared in accordance with the time chart of FIG. 12 and the inherent data which is referred to when power consumption corresponding to the same respective operation modes of a composite machine as those shown in FIG. 6, which are stored in the memory means such as the ROM 511, the SRAM 512, or the hard disk 517, is calculated.

In this way, even in the case in which the operation modes in the composite machine are distinguished, respectively, and the composite machine takes an intermittent operations such as the respective operations modes being suspended and resumed, since the timer function for managing them is provided, as shown in FIG. 13, "reception/expansion" processing and "image formation" processing can be distinguished to be recorded or a time required for the respective operations can be recorded more accurately in the copy output mode or the print output mode. In FIG. 13, for example, a time during which the composite machine operated in the print output mode is "(T4−T3)+(T7−T6)". It goes without saying that such measurement of an accurate operation time is not limited, to that at the time of execution of the copy output mode and the print output mode but can be applied in various combinations of operation modes.

Moreover, if the power consumption standard for the print output mode in FIGS. 6 and 7 are stored with respect to the operation modes classified in detailed as shown in 1304 of FIG. 13, more accurate power consumption in the print output mode can be calculated based on a timed value for a time required for a detailed operation mode in the print output mode to be managed in FIG. 13 and a detailed power consumption standard stored for the stored operations modes classified in detail. It goes without saying that this is not limited to the print output mode but is true for various operation modes.

In addition, the prepared electric power data is provided to a display unit of the composite machine or a terminal apparatus located in a place remote from the composite machine by the same mechanism as those described in the first to fourth embodiments.

That is, display as in FIG. 9 based on various kinds of log information is given by applying this embodiment to the first or second embodiment. In addition, statistic information based on FIG. 4 or 5 or 7 or 8 is outputted to a client PC external to the composite machine and display indicating statistic information is given on a display unit provided in the client PC by applying this embodiment to the third embodiment. Further, log information (statistic information) obtained from a plurality of composite machines by the management server 101 is outputted to a client PC and statistic information based on FIG. 4 or 5 or 7 or 8 is displayed on a display unit in the client PC by applying this embodiment to the fourth embodiment. In this way, it goes without saying that display of statistic information as in FIG. 8 or 9 based on log information (statistic information) prepared in the composite machine can be applied to forms given by various apparatuses such as a composite machine and an external apparatus externally connected to the composite machine.

Note that, in the case in which statistic information is displayed on an external apparatus, the composite machine may inform the external apparatus of log information as in FIG. 4 or 5 and the external apparatus (the management server 101, the client PC, etc.) may prepare the statistic information to be displayed on a display unit as described in the fourth embodiment.

In addition, in the time chart shown in FIG. 12, operations to be executed in parallel have been explained with the two modes, namely, the print output mode and the copy output mode as examples. However, it goes without saying that this embodiment is not limited to this but can be applied to various forms such as the print output mode, the FAX transmission mode, the print output mode, the FAX reception output mode, and combinations of three or more operation modes.

In addition, an operation mode at the time when an error such as jam or no-sheet-in-cassette occurs may be included as an operation mode. In a mode at the time when an error occurs, an operation for blocking power supply to a portion related to a part where the error occurs is assumed.

In this way, according to this embodiment, since the means is provided which realizes timer functions independent from each other for each mode in the composite machine, log information can be recorded accurately, for example, with (T10−T9) and (T12−T11) as times required for the copy output mode according to data managed in 1305 of FIG. 13. As a result, a problem in that a standby time of print output of T11−T10 is recorded as a time required by the copy output mode can be solved. In addition, similarly, a time of (T5−T4) can be deducted from a time required for the processing of the print output mode.

Further, since the log information as shown in FIG. 13 is managed by associating user identification information such as a user ID or an ID of a department, to which the user belongs, to the respective timer functions, the respective operation mode to be executed in parallel in the composite machine can be managed for each user precisely. Even in the case in which predetermined mode operations are executed in parallel in the composite machine, a problem in that the mode operations cannot be managed by switching users performing the mode operations can be solved.

Sixth Embodiment

In the first to fifth embodiments, when information cumulated as log information in a terminal apparatus located in a remote place, which is based on log information prepared in a composite machine, is notified to an external client PC, if the composite machine notifies the information as information in accordance with a markup language such as HTML, the terminal apparatus is capable of browsing the notice according to the log information utilizing a browser based on the received information.

Seventh Embodiment

In the first to sixth embodiments, as described with FIG. 12 as an example, an operation time for each operation mode such as the print output mode and the copy output mode is independently measured and an electric energy required for each operation mode is calculated based on history data during the measured time.

On the other hand, a composite machine has an operation mode involving a print output operation and an operation not involving the print output operation. Examples of the print output mode include a FAX transmission mode and a SEND mode for transferring an image based on an original read in via an original feed apparatus to another information processing apparatus or image forming apparatus. Moreover, examples of the operation mode not requiring the print output operation include the copy output mode (T10−T9) as shown in FIG. 12.

Concerning such an operation mode not involving the print output operation, the form as described in FIG. 12 is also assumed, which makes a distinction in that an electric energy required for a predetermined operation mode is calculated based on measuring an operation time using an independent timer function and an electric energy is calculated based on the number of outputted sheets with respect to an operation mode in a period involving execution of the print output operation as described with reference to FIG. 12.

For example, the periods of (T7−T6) and (T12−T11) are equivalent to the period involving execution of the print output operation. In this period, for example, a table showing an electric power of 10 W for one print output operation is stored in a memory unit of a composite machine or an external apparatus (the management server 101 or the PCs 107 to 110 of FIG. 11, etc.) in advance, and in the case in which the print output operation stored in this memory unit is performed for a predetermined number of sheets, an electric energy required for the operation mode of the period involving execution of the print output operation can be calculated from power consumption and the number of outputted sheets.

Counting of the number of printed sheets may be performed by the composite machine or the external apparatus, and the memory unit may be provided in the composite machine or the external apparatus.

In this way, an electric energy is found based on the number of printed sheets in association with the operation mode involving the print output operation and an electric energy is found based on measurement of an operation time as described in FIG. 12 in association with the operation mode not involving the print output operation, whereby a processing load of a timer can be reduced and it becomes possible to accurately measure an operation time for each operation mode.

According to the seventh embodiment, a processing load of a timer unit can be reduced and, at the same time, an accurate electric energy which a composite machine required for operation can be calculated.

Note that calculation of an electric energy and presentation of the calculated electric energy can be performed in a composite machine or in an external apparatus. It goes without saying that, concerning this point, the forms described in the first to sixth embodiments can be adopted appropriately.

Eighth Embodiment

In the first to seventh embodiments, statistic information as shown in FIGS. 4, 5, 7, 8, and 9 of power consumption in each operation mode in a composite machine, has been described based on a timed value of a timer in, each operation mode and the table concerning power consumption per a unit time for each mode showing a power consumption standard as shown in FIG. 6. However, the present invention is not limited to this. For example, the statistic information may be found according to values based on various measuring devices such as an ampere meter and a voltage meter provided in the composite machine. In this case, the system controller 510 calculates power consumption in various operations modes as shown in FIG. 5 based on measurement values of the measurement devices. Calculated results are the same as those in FIG. 7.

Other Embodiment

A program required for executing the above-mentioned embodiments is also one invention of this application. This program is provided to a computer or the like through a transmission medium or a recording medium. As the recording medium for supplying a program code, for example, a floppy disk, a hard disk, an optical disk, a magneto-optical disk, a CD-ROM, a CD-R, a magnetic tape, a nonvolatile memory card, and an ROM can be used.

In addition, a computer executes a read out program code, whereby the functions of the above-described embodiments are realized. Further, an OS or the like running on the computer performs a part or all of actual processing based on an instruction of the program code, and the functions of the above-described embodiments can be realized by the processing.

Moreover, after a program code read out from a storage medium is written in a memory provided in a function extending board inserted in a computer or a function extending unit connected to the computer, a CPU or the like provided in the function extending board or the function extending unit performs a part or all of actual processing based on an instruction of the program code, and the functions of the above-described embodiments can be realized by the processing.

Note that it goes without saying that the invention of this application can be applied to the case in which a program code of software for realizing the functions of the above-described embodiments is distributed to a requester via a communication line such as a personal computer communication from a storage medium having the program code recorded therein.

In addition, it goes without saying that the invention of this application can be applied not only to a composite machine but also to various image processing apparatuses such as a facsimile apparatus and a composite machine which adopts the inkjet system.

As described above, according to the above-described embodiments, a composite machine provides a user of power consumption data corresponding to an operation mode, whereby the user is urged to grasp a state of power consumption, and it is expected that energy saving in offices is facilitated.

The invention claimed is:

1. An information processing apparatus for managing an image processing apparatus having a processing mode which involves processing related to an image and having a plurality of power control modes which do not involve processing related to the image, wherein the plurality of power control modes include a standby mode, and a low power mode which consumes power that is smaller than power consumed in the standby mode, the information processing apparatus comprising:

a specifying unit that specifies user identification information which identifies at least one of a user that uses the image processing apparatus and a department to which the user belongs;

a counting unit that counts a page outputting number for the processing mode;

a timing unit that times an operation time for each of the plurality of power control modes;

a memory unit that stores a power consumption amount per page for the processing mode, and a power consumption amount per unit time for each of the plurality of power control modes;

a calculation unit that calculates (i) a power consumption amount of the image processing apparatus for the processing mode by multiplying the power consumption amount per page stored by said memory unit and the page outputting number counted by said counting unit, and (ii) a power consumption amount of the image processing apparatus for the plurality of power control modes by multiplying the power consumption amount per unit time stored by said memory unit and the operation time timed by said timing unit; and a preparation unit that prepares statistical information concerning (i) the power consumption amount of the image processing apparatus for the processing mode calculated by said calculation unit, and (ii) the power consumption amount of the image processing apparatus for the power control mode calculated by said calculation unit, wherein said preparation unit prepares the statistical information concerning the power consumption amount of the processing mode for the specified user identification information specified by said specifying unit and concerning the power consumption amount of the plurality of power control modes such that the power consumption amount of the plurality of power control modes is not associated with any user identification information.

2. The information processing apparatus according to claim 1, further comprising an output unit that performs an output of the statistical information for the specified user identification information prepared by said preparation unit when the user identification information is specified by said specifying unit.

3. The information processing apparatus according to claim 2, wherein said output unit sends the prepared statistical information concerning power consumption to a terminal apparatus external to the image processing apparatus as a markup language.

4. The information processing apparatus according to claim 2, wherein said output unit outputs the prepared statistical information concerning power consumption to a display unit during designated processing for designating the processing mode or during execution of the processing mode.

5. The information processing apparatus according to claim 1, wherein the processing mode is a copy mode or a printer mode.

6. An information output method for outputting information concerning power consumption in an image processing apparatus having a processing mode which involves processing related to an image and having a plurality of power control modes which do not involve processing related to the image, wherein the plurality of power control modes include a standby mode, and a low power mode which consumes power that is smaller than power consumed in the standby mode, the information output method comprising the steps of:
performing the following steps using a processor:
specifying user identification information which identifies at least one of a user that uses the image processing apparatus and a department to which the user belongs;
counting a page outputting number for the processing mode;
timing an operation time for each of the plurality of power control modes;
reading out power consumption amount per page data for the processing mode and power consumption amount per unit time data for each of the plurality of power control modes;
calculating (i) a power consumption amount of the image processing apparatus for the processing mode by multiplying the power consumption amount per page data read by said reading step and the page outputting number counted by said counting step, and (ii) a power consumption amount of the image processing apparatus for the plurality of power control modes by multiplying the power consumption amount per unit time data read by said reading step and the operation time timed by said timing step; and
preparing statistical information concerning (i) the power consumption amount of the image processing apparatus for the processing mode calculated by said calculating step, and (ii) the power consumption amount of the image processing apparatus for the plurality of power control modes calculated by said calculating step,
wherein said preparing step prepares the statistical information concerning the power consumption amount of the image processing mode for the specified user identification information specified by said specifying step and concerning the power consumption amount of the plurality of power control modes such that the power consumption amount of the plurality of power control modes is not associated with any user identification information.

7. The information output method according to claim 6, further comprising an output step for outputting of the statistical information for the specified user identification information prepared by said preparing step when the user identification information is specified by said specifying step.

8. The information output method according to claim 7, wherein said output step sends the prepared statistical information concerning power consumption to a terminal apparatus external to the image processing apparatus as a markup language.

9. The information output method according to claim 7, wherein said output step outputs the prepared statistical information concerning power consumption to a display unit during designated processing for designating the processing mode or during execution of the processing mode.

10. The information output method according to claim 6, wherein the processing mode is a copy mode or a printer mode.

11. A non-transitory computer readable storage medium having stored therein a program which is executed by an information processing apparatus for outputting information concerning power consumption in an image processing apparatus having a processing mode which involves processing related to an image and having a plurality of power control mode modes which do not involve processing related to the image, wherein the plurality of power control modes include a standby mode, and a low power mode which consumes power that is smaller than power consumed in the standby mode, the information program comprising the steps of:
specifying user identification information which identifies at least one of a user that uses the image processing apparatus and a department to which the user belongs;
counting a page outputting number for the processing mode;
timing an operation time for each of the plurality of power control modes;
reading out power consumption amount per page data for the processing mode and power consumption amount per unit time data for each of the plurality of power control modes;
calculating (i) a power consumption amount of the image processing apparatus for the processing mode by multiplying the power consumption amount per page data read by said reading step and the page outputting number counted by said counting step, and (ii) a power consumption amount of the image processing apparatus for the plurality of power control modes by multiplying the power consumption amount per unit time data read by said reading step and the operation time timed by said timing step; and
preparing statistical information concerning (i) the power consumption amount of the image processing apparatus for the processing mode calculated by said calculating step, and (ii) the power consumption amount of the image processing apparatus for the plurality of power control modes calculated by said calculating step,
wherein said preparing step prepares the statistical information concerning a power consumption amount of the image processing mode for the specified user identification information specified by said specifying step and concerning the power consumption amount of the plurality of power control modes such that the power consumption amount of the plurality of power control modes is not associated with any user identification information.

* * * * *